United States Patent [19]
Daniels et al.

[11] Patent Number: 5,330,618
[45] Date of Patent: Jul. 19, 1994

[54] PROCESS FOR SEPARATING DISSOLVED SOLIDS FROM A LIQUID USING AN ANTI-SOLVENT AND MULTIPLE EFFECT EVAPORATORS

[75] Inventors: Edward J. Daniels, Oak Lawn; Bassam J. Jody, Chicago; Patrick V. Bonsignore, Channahon, all of Ill.

[73] Assignee: University of Chicago, Chicago, Ill.

[21] Appl. No.: 988,447

[22] Filed: Dec. 10, 1992

[51] Int. Cl.$^5$ .............................................. B01D 1/26
[52] U.S. Cl. ..................................... 159/47.1; 23/300; 23/303; 75/672; 159/29; 159/17.1; 159/DIG. 8; 202/174; 203/73; 203/DIG. 9; 423/131; 423/205; 423/208; 423/658.5
[58] Field of Search .................. 159/DIG. 8, 47.1, 29, 159/17.1; 202/174; 203/73, 71; 423/131, 205, 208, 658.5; 23/303, 300; 75/672

[56] References Cited

U.S. PATENT DOCUMENTS

| | | | |
|---|---|---|---|
| 2,941,590 | 6/1960 | Rosenblad | 159/47.3 |
| 3,198,608 | 8/1965 | Miller et al. | 23/300 |
| 3,384,459 | 5/1968 | Carter et al. | 23/303 |
| 3,424,562 | 1/1969 | Gaska et al. | 23/300 |
| 3,607,668 | 9/1971 | Williamson | 203/24 |
| 3,819,335 | 6/1974 | Daniels et al. | 23/300 |
| 4,049,502 | 9/1977 | Nagels | 203/DIG. 18 |
| 4,073,644 | 2/1978 | Papafingos et al. | 75/672 |
| 4,548,614 | 10/1985 | Ireland | 23/300 |
| 4,753,740 | 6/1988 | Marlett et al. | 423/208 |

FOREIGN PATENT DOCUMENTS

| | | | |
|---|---|---|---|
| 0075066 | 4/1968 | Fed. Rep. of Germany | 23/300 |
| 0256294 | 8/1926 | United Kingdom | 23/303 |

OTHER PUBLICATIONS

The Engitec System For Treatment of Salt Slag From Secondary Aluminum Smelters, R. M. Reymonds, P. E., et al., 1990 Second International Symposium, Recycling of Metals and Engineered Materials, pp. 439–450.
The Recovery of Products From Salt Cake As An Alternative to Disposal, Meeting on Aluminum Dross and Baghouse Dust Treatment Processes, (1990).
Experimental Processing of Salt Slags From an Aluminum Dross Furnace, Bureau of Mines Report of Investigations (1980): Michael J. Magyar et al.
Freeze Crystallization Leaves Contaminants Out In The Cold; K. Roy, Hazmat World, Dec. 1990, pp. 56–60.

Primary Examiner—Virginia Manoharan
Attorney, Agent, or Firm—Emrich & Dithmar

[57] ABSTRACT

A process and system for treating aluminum salt cake containing water soluble halide salts by contacting the salt cake with water to dissolve water soluble halide salts forming a saturated brine solution. Transporting a portion of about 25% of the saturated brine solution to a reactor and introducing into the saturated brine solution at least an equal volume of a water-miscible low-boiling organic material such as acetone to precipitate a portion of the dissolved halide salts forming a three-phase mixture of an aqueous-organic-salt solution phase and a precipitated salt phase and an organic rich phase. The precipitated salt phase is separated from the other phases and the organic rich phase is recycled to the reactor. The remainder of the saturated brine solution is sent to a multiple effect evaporator having a plurality of stages with the last stage thereof producing low grade steam which is used to boil off the organic portion of the solution which is recycled.

20 Claims, 3 Drawing Sheets

PROCESS FOR SEPARATING DISSOLVED SOLIDS FROM A LIQUID USING AN ANTI-SOLVENT AND MULTIPLE EFFECT EVAPORATORS

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

Scrap-aluminum recycling starts with the melting of the scrap aluminum in open-hearth reverberatory furnaces. In order to decrease the interfacial tension of the dross/aluminum and allow the aluminum to coalesce for easier separation as well as to minimize the oxidation of the molten aluminum and to capture the aluminum oxide that forms during the melting process, a salt mixture called flux, is spread on top of the bed. Flux typically consists of about 62% by weight sodium chloride, 32% by weight potassium chloride and 6% by weight other materials, including cryolite ($Na_3AlF_6$). This layer also serves to trap impurities such as magnesium chloride, which also reports to the flux layer. After the melting process is completed, the top layer of dark-colored material, called dross, is removed for further processing to recover some of its aluminum content. The black dross typically consists of aluminum metal (10–20% by weight), salt-flux mixture (40–55% by weight), and aluminum oxide (20–50% by weight). One of two methods is used to process the black dross for the recovery of aluminum: (1) reprocessing of the black dross in a rotary furnace (along with low grade scrap) or (2) physically separating the aluminum from the black dross using hammer mills. When the aluminum content of the dross is such that it is not economical to recover, the dross is disposed of in landfills. Rotary furnace processing requires the addition of salt fluxes in even larger quantities than that required for reverberatory furnace processing.

Residue generated by the rotary furnaces is referred to as salt cake, and it contains about 3–5% by weight aluminum, 15–30% by weight aluminum oxide, 30–45% by weight sodium chloride, 20–30% by weight potassium chloride and minor amounts of the chlorides of impurities such as magnesium chloride. The amount of black-dross and salt-cake residues generated from U.S. secondary aluminum-smelting plants in 1988 was approximately $229 \times 10^3$ tons. The quantities of scrap and salt cake that are being processed are increasing. Because the salts are readily leachable, the disposal of this material in landfills is becoming more costly and less acceptable. Therefore, alternatives to disposal in landfills are in demand.

PRIOR ART

In Europe, prototype salt-cake-recycling systems (less than $60 \times 10^3$ t/yr) have been undergoing field testing and limited operation for a few years. Most of these systems have been installed in Italy and in Germany, countries in which the disposal of salt cake in conventional landfills is not permitted. Two organizations are marketing their systems in the United States: (1) Engitec Impianti, S.p.A. of Italy, which is represented in the United States by Lake Engineering, Inc. and (2) Berzelius Unwelt-Service AG. (B.U.S.), which is represented in the United States by Horsehead Resource Development Co., Inc. These systems devised by both of these organizations employ essentially the same steps, crushing and screening for aluminum recovery, salt leaching, off-gas treatment and evaporation/crystallization for salt recovery.

In 1977, Engitec installed its first system in Italy, a system that is capable of recovering $21 \times 10^3$ t of salt per year. In 1988, this plant was renovated and retrofitted with an energy-efficient evaporator/crystallizer equipped with a mechanical vapor compressor. Engitec has also pilot tested a proprietary flash evaporator to be used with small recycling plants, as well as a preconcentration unit for large-capacity evaporator/crystallizer systems.

The B.U.S. (German) system was installed in Germany about four years ago, and it has been in operation since that time. It was designed to process $50 \times 10^3$ short tons of salt cake and $13 \times 10^3$ short tons of ball mill dust per year. So far, this plant has processed over $240 \times 10^3$ short tons of salt cake and ball mill dust. B.U.S. is planning to have two more operating plants in Germany by the end of 1991 bringing the total installed capacity to over $260 \times 10^3$ short tons per year. The salt recovered from this process meets the specifications of the smelters. In the last four years, $130 \times 10^3$ short tons of salt have been recovered and reused successfully by eight secondary aluminum smelters. Horsehead Resource Development Co., B.U.S.'s U.S. market business partner, estimated the capital cost for a 100-t/day system to be about $35,000,000.

The U.S. Bureau of Mines developed, in the late 1970's, a method to recover aluminum, aluminum oxide, and fluxing salts from dross and salt cake. In this method, dross or salt cake is leached with water at room temperature to produce a saturated brine slurry. The slurry is screened to yield an aluminum-rich fraction that can be returned to the rotary furnace. The remaining slurry is vacuum filtered, yielding a clear brine solution and an aluminum-oxide cake. Evaporation of the clear brine solution results in over 80% of the metallic aluminum and essentially all of the fluxing salts being recovered. This method does not employ crushing of the salt cake or the dross. With the exception of the lack of crushing, the process steps are essentially the same as those employed in the European technologies.

American Recovery Technology Systems (ARTS) has designed, built, and is currently operating its first dross and salt-cake recycling system in Cleveland, Ohio. The plant has a capacity of processing about $65 \times 10^3$ t/yr. The closed-loop system consists essentially of the same processes employed in the European technologies; crushing, leaching and evaporation/crystallization. The evaporation is carried out at temperature of about 238°–240° F.

Alcan International Limited and Plasma Energy Corporation are currently developing a dross processing technology that does not require salt. This process uses a specially designed rotary furnace heated by a plasma-arc gas heater. Inside the plasma torch are two tubular electrodes placed end-to-end but separated by a small gap. During operation, a process gas, such as air or nitrogen, is injected into the small gap between the electrodes. This arc heats the incoming gas to temperatures in excess of 5,000° C. At this temperature, the gas is dissociated and partially ionized. The ionized gas (plasma) is ejected out of the torch and into the rotary furnace to heat the dross.

The pilot dross-plasma-treatment plant was installed in 1988. The plasma torch is rated at 1 MW, and the capacity of the rotary furnace is about 3 t/h. The 1-MW torch uses 1.5-3 m$^3$ of gas per minute. It is designed to process industrial scale samples of dross, and blocks up to 1 t can be charged (as can very dusty dross). The rotary furnace is designed to be airtight, and during its operation, the inside pressure is always maintained positive to prevent outside air infiltration. To date, about 400 tons of dross representing a total of about 150 batches, have been processed. The dross was supplied from various primary and secondary-aluminum production plants in the United States, Canada and Europe. The aluminum content in these samples ranged from 10% by weight to 80% by weight. The typical electrical energy input into the system per metric ton of dross processed was estimated by Alcan to be about 844 k Wh for the nitrogen plasma and 475 kWh for the air plasma.

The plasma dross-treatment process is an innovative and potentially cost-effective approach for the recovery of aluminum from the drosses of the primary aluminum industry. The key advantage of this process is that it eliminates the salt-flux requirements in dross processing. As a result, it can generate salt-free by-products, if the dross charged into the furnace did not contain any salt, as is typically the case in some of the drosses of the primary aluminum industry. If the dross processed contains salt flux, as in black dross, the salt will remain in the vitrified residual waste, which may not be leachable.

As discussed earlier, several commercial processes are being developed for the leaching of chlorides from aluminum salt cake using water. These methods rely on the evaporation of water to concentrate and recover the salts after they are leached. This process is energy-intensive; it requires a minimum of about 0.64 k Wh/kg water processed using a single-stage evaporator. Licon, Inc. in Pensacola, Fla., stated in its literature that similar solutions can be concentrated by using about 50–100 Btu/lb (0.032–0.065 kWh/kg) of water removed. Licon's method uses vapor compression to recycle the latent heat and operates at reduced pressures in the range of 20–26 in. of mercury. The corrosive nature of the salt cake and dross may require special construction materials, resulting in increased costs.

OBJECTS OF THE INVENTION

An important object of the invention is to provide a process and system for treating aluminum salt cake wherein a portion of the saturated brine solution formed therefrom is treated to precipitate salt in an energy free exchange by the use of a combination multiple effective evaporator and a solvent/anti-solvent system.

Another object of the invention is to provide a system and process for treating aluminum salt cake which utilizes normally unusable low grade steam to effect a solvent separation of a portion of the salt cake.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
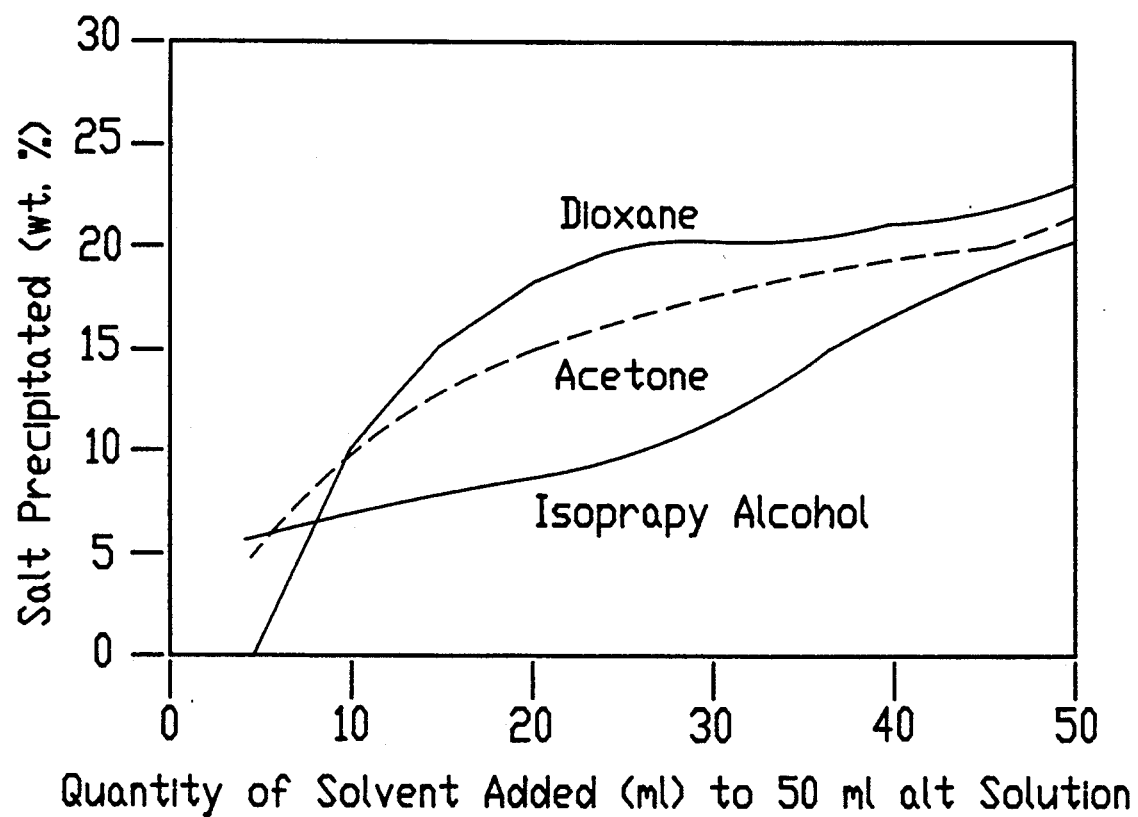
FIG. 1 is a graph showing salt precipitation as a function of various quantities of low-boiling water-miscible solvents.

Precipitation of a solute from a solvent using another solvent in which the solute is less soluble has been practiced in the chemical and petrochemical industries, but until now it has not been used to treat aluminum salt cake. We experimented with this technique to separate the salts from water. In the laboratory, we tested the use of water-miscible organic solvents to precipitate salts from a saturated salt-cake solution by using several organic solvents that have high solubility in water (acetone, isopropyl alcohol, ethyl methyl ketone, methyl alcohol, tetrahydrofuran, and dioxane). The inorganic salts, commonly found in salt cake, have negligible solubility in these organic solvents. Because of their high affinity for water and their relative insensitivity to the salts, these solvents can displace the salts in solution, thereby causing the salts to precipitate as one phase, leaving a second phase of a significantly lowered salt-containing organic solvent/water mixture. After the precipitate is filtered, the liquid mixture can be separated by distillation, with both the solvent and the water recovered for reuse. The latent heat of vaporization as well as the boiling points of the preferred organic solvents are considerably lower than that of water. Therefore, lower-grade heat can be used in the distillation process. Corrosion problems are reduced because we distill a mixture having a lower salt concentration.

Experiments were conducted using a saturated salt-cake solution prepared with the salts recovered from an actual sample of salt-cake slag. The salt content of the solution was found to be 31.5% by weight, and it contained about 45% potassium chloride and 55% sodium chloride. Various quantities of solvents were added to 50 ml samples of salt-saturated water solution. As a result, various amounts of salts precipitated from solution. After about an hour, the precipitates were filtered, dried and weighed. In the samples where excess solvent was added, except for the alcoholic solvents, two liquid phases separated, because the solubility of the water-miscible solvents decreased in the salt solution, as compared with salt-free water. We found that the excess layer or third phase can be decanted and reused without additional treatment because the level of contamination is low. However, the effectiveness for salt precipitation is less than that of fresh anti-solvent.

Preliminary tests of mutual compatibility eliminated methyl alcohol, methyl ethyl ketone and tetrahydrofuran from further consideration. Methyl alcohol, even though it was compatible with the salt solution, caused negligible salt precipitation. The other two solvents showed negligible solubility in the salt solution. Warranting further consideration were acetone, isopropyl alcohol and dioxane. The results obtained with these water miscible solvents are summarized in Table 1 and FIG. 1.

TABLE 1

Salt Precipitation with Water Miscible Solvents

| VOLUMES (ml) OF | | Mass Percent of Salts Recovered | | |
|---|---|---|---|---|
| Sat. water sol | Solvent added | Acetone | Isopropyl Alcohol | Dioxane |
| 50 | 5 | 5.0 | 5.8 | 0 |
| 50 | 10 | 9.3 | 6.7 | 9.7 |
| 50 | 20 | 15.0 | 9.0 | 18.3 |
| 50 | 30 | 17.0 | 11.4 | 19.7 |
| 50 | 40 | 19.2 | 17.0 | 20.5 |
| 50 | 50 | 22.5 | 20.0 | 23.8 |
| 50 | 100 | 32.9 | 33.1 | 31.6 |

As expected, we observed that the solubility of these organic water miscible solvents in the salt solution was significantly decreased, as compared with salt-free water, so that a separate third upper phase, rich in organic water miscible solvents was formed. We investigated whether this third upper phase could be used after decanting for the desalting of fresh saturated solutions. In the case of acetone, 30 mL of the supernatant liquor was added to 50 mL of fresh saturated solution. This procedure resulted in the precipitation of 1.65 g of salt (8.5%), which is about half what was precipitated when fresh acetone was used. Similarly, when 30 mL of isopropyl alcohol was added to 50 mL of fresh saturated solution, it precipitated about 1.14 g of salt (5.9%). This quantity of salt represents about half of what was precipitated when fresh isopropyl alcohol was used.

Examination of the data in Table 1 and FIG. 1 indicates that on the basis of the amount of salt precipitated per milliliter of solvent added, dioxane appears to be the most effective, followed by acetone. However, dioxane not only has a boiling point close to water but it also forms an azeotrope with water, which makes it more difficult to separate and to reuse. Moreover, in both cases, the energy required to regenerate the solvent is more than the energy required to separate the same amount of salt by boiling the water. For example, to boil off 1 lb. of acetone, about 22% of the energy requirement to boil 1 lb. of water is needed, but it will precipitate about 20% of the salt that can be precipitated by boiling the water. Therefore, larger evaporation equipment will be required for the evaporation of the acetone. However, because the acetone-water solution contains less salt, it should be less corrosive and thus require lower grade and less expensive steel for fabrication.

We also evaluated a hybrid system in which water is boiled off in the first section and acetone is used in the second section. The steam generated in the first section leaving a multiple-effect evaporator at about 1 atm is used to regenerate the solvent in the second section. This system takes advantage of the lower boiling temperature of the acetone. This system is illustrated, schematically in FIG. 2. The solvent section can be sized to match the capacity of the effluent steam from the multiple-effect evaporator, and thus it could be operated energy-free. Typically, the solvent section should be able to handle about 25% of the total saturated brine solution, which corresponds to a 25% reduction in the energy requirement of the process employed to separate the water from the salts.

Figure 2:
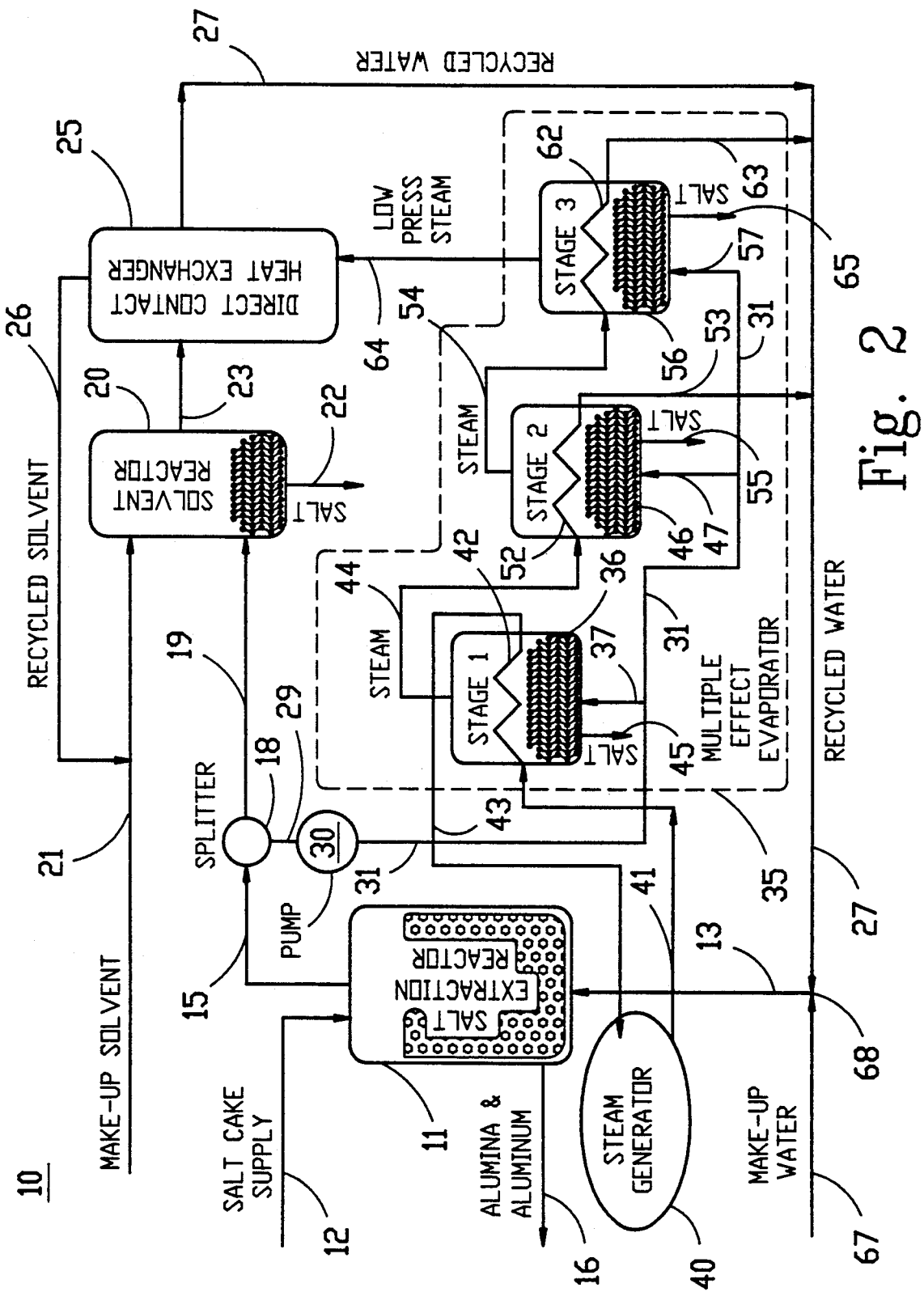
FIG. 2 is a schematic diagram of the inventive process and system.

Referring now to FIG. 2, there is disclosed a system 10 for treating salt cake including a salt extraction reactor 11 provided with an inlet line 12 through which a supply of salt cake is fed to the reactor 11. An inlet water line 13 introduces water to the salt extraction reactor 11. After the salt dissolves in the water inside the reactor 11, a saturated brine solution exits the reactor 11 via a line 15 where it is transported through a splitter 18. The splitter 18 can split the saturated brine from line 15 in a number of ratios that depends on the amount of heat available from the multiple effect evaporator and on the heat of vaporization of the solvent. For example, when acetone is used as the anti-solvent the splitter 18 can be arranged to provide about 25% by weight of the brine solution through line 19 to a solvent reactor 20, the remaining 75% of the brine solution being directed as hereinafter set forth.

The solvent reactor 20 receives solvent through an inlet line 21 and in the reactor, as previously disclosed, the solvent displaces salt from the saturated brine solution thereby creating a multiphase mixture within the solvent reactor 20. Depending upon the amount of solvent introduced into the saturated brine solution pumped in through line 15, there will be two or three phases within the solvent reactor 20. One phase will be the precipitated salt illustrated in the drawing which exits through line 22 either as a relatively dry salt or as a slightly wet slurry of salt. Either one or two other phases, one being a combination of the solvent and water phase and the other being principally a solvent phase, exist in the reactor 20 depending on the amount of solvent introduced into the reactor. The two liquid phases exit the reactor 20 through a line 23 and are transmitted to a direct contact heat exchanger 25 which receives low pressure steam through a line 64, as will be explained, which heats the liquid in the heat exchanger 25 to boil off the solvent which leaves the heat exchanger 25 through a line 26 and is recycled to the line 21 for introduction and reuse in the solvent reactor 20. The remaining material in the heat exchanger 25 is a combination of the condensed water from the low pressure steam introduced through line 64 and the water remaining after the solvent has been driven off and this material exits through a manifold line 27 for eventual return to reactor 11.

A pump 30 receives about 75% of the saturated brine leaving the splitter 18 and the salt extraction reactor 11 via the exit line 15. The pump 30 pumps the saturated brine through a manifold 31 and into a multiple effect evaporator 35 including a first stage 36 having a line 37 connecting the manifold 31 and the first stage 36 through which saturated brine is introduced into the stage one heat exchanger 36.

A steam generator 40 provides steam through a line 41 to the first stage evaporator 36 wherein the saturated brine from the salt extraction reactor 11 is introduced through line 37 and indirectly contacts the heated steam in what is essentially a tube and shell heat exchanger with the saturated brine solution being on the shell side and the steam from the generator 40 being on the tube side. The tube portion 42 of the heat exchanger carries the steam through the first stage 36 and then through an exit line 43 back to the steam generator 40. Salt which is concentrated in the first stage evaporator 36 (or dry salt) by the boiling off of steam from the saturated brine introduced through line 37 exits the first stage evaporator 36 through a line 45 while the steam produced during the heat exchange is transmitted via a line 44 to the heat exchange portion 52 of a second stage evaporator 46.

The second stage evaporator 46 is provided with an inlet line 47 connecting the manifold 31 with the second stage evaporator 46. Saturated brine from the salt extraction reactor 11 is introduced into the second stage evaporator 46 via the line 47 where it contacts the tube side 52 of what is essentially a tube and shell heat exchanger causing the brine to be concentrated and exit through line 55 while steam which is generated during the concentration of the brine leaves the stage two evaporator 46 through a line 54. The steam from the stage two evaporator 46 is introduced into the stage three evaporator 56 where it contacts saturated brine from the salt extraction reactor 11 which has been introduced to the stage 3 evaporator 56 through line 57 which is connected to the manifold 31. The heat exchange portion 62 which receives the steam from line 54 from the stage two evaporator 46 is in heat exchange relationship with the saturated brine within the third stage evaporator 56 and causes steam to boil off of the material resulting in a concentrated brine solution in the stage three evaporator 56 leaves the evaporator through an exit line 65. The low grade steam leaves the stage three evaporator 56 through the line 64 and is introduced into the direct contact heat exchanger 25 in order to provide sufficient energy to evaporate the solvent in the heat exchanger 25.

Finally, the manifold line 27 connects the condensate from the heat exchanged portions 62 of the stage three evaporator 56 and the condensate 53 from the stage two evaporator 46 and particularly the heat exchange portion 52 thereof and the condensates from the stage two evaporator and the stage three evaporator are transmitted via the manifold 27 to a valve 68 which is controlled by means not shown to combine make-up water from a line 67 with the condensates to reintroduce water into the salt extraction reactor 11 continuously to dissolve salts from the supply of salt cake introduced through line 12 in order to continuously provide saturated brine which leaves the reactor 11 through the line 15.

More specifically, and for purposes of illustration only, steam from the steam generator 40 may be supplied as saturated steam at 130° C. and at about 2.7 atmospheres. As the steam is transported through the stage one evaporator 36, it condenses in the heat exchange portion 42 and exits through line 43 where it is returned to the steam generator 40 for reuse. The brine solution in the first stage evaporator 36 introduced via a line 37 is maintained at a pressure of about 2 atm so that the heating in the stage one evaporator 36 produces saturated steam at about 120° C. and at about 2 atms and this steam exits through line 44 and is used on the tube side of the heat exchanger 52 portion in the second stage evaporator 46. The 120° steam which is used on the tube side of the stage two evaporator 46 will heat the saturated brine which is introduced into that evaporator via a line 47 and from this brine will be generated steam at about 110° C. and at about 1.4 atms which is the pressure maintained within the stage two evaporator 46. This steam is transmitted via a line 54 to the stage three evaporator 56 and particularly to the heat exchanger portion 62 therein. The saturated brine introduced into the stage three evaporator 56 via a line 57 is maintained at about 1 atm so that the steam produced in the stage three evaporator from the heat exchange between the saturated brine from the salt exchange reactor 11 and the steam within the heat exchange portion section 62 will be at about 100° C. and at about 1 atm. This steam is low grade steam but it is sufficient when transmitted via a line 64 for direct contact with the solvent and solvent water mixtures or solutions in the heat exchanger 25 to boil off or evaporate the solvent contained in the heat exchanger 25 for return via a line 26 to the solvent line 21 and then to the solvent reactor 20.

Accordingly, it is seen that normally waste heat in the form of the low pressure steam generated in the stage three evaporator 56 is used to treat about 25% of the saturated brine solution formed in the reactor 11.

Figure 3:
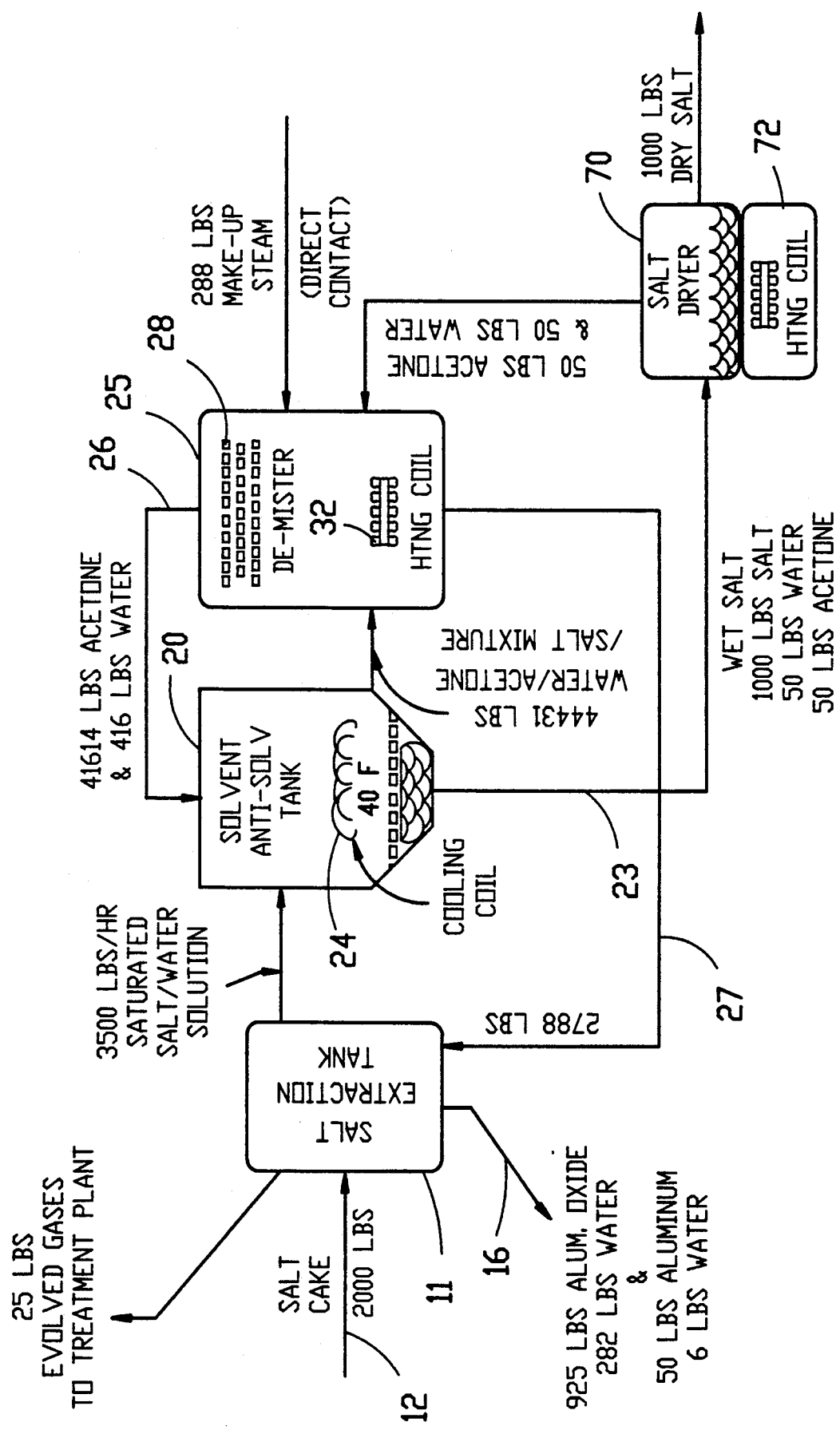
FIG. 3 is an approximate material balance for the inventive process.

Referring now to FIG. 3, there is disclosed for illustrative purposes only what is essentially a material balance for the system 10 previously described, the calculations being made on a theoretical batch of 8000 lbs. of salt cake being introduced to the reactor 11 via the line 12. About 2000 lbs. of this will be treated using the anti-solvent system previously described. For the 2000 lbs. of salt cake, 925 lbs. of an aluminum oxide and 50 lbs. of aluminum are produced and exit the reactor 11 via the line 16. In the solvent/anti-solvent reactor 20, there is a cooling coil 24 connected to a source of coolant such as cold water in order to reduce the temperature in the solvent/anti-solvent reactor 20 to the preferred 40° F. Because the salt extraction reactor is operated at ambient temperatures, that is 60°-70° F. and the acetone coming back from the direct contact heat exchanger 25 is at about 56° C. or about 133° F. there is required some mechanism for cooling the material residing in the solvent/anti-solvent reactor 20 in order for more salt to precipitate, it being understood that more salt will precipitate from a cooler solution than from a warmer solution.

In the direct contact heat exchanger 25 is a demister 28 in order to prevent fine water particles from the steam from travelling upwards with the acetone as it is recycled by line 26 to the reactor 20. An auxiliary heating coil 32 may be present in the direct contact heat exchanger 25 in order to provide auxiliary heat when needed in the event that the amount of low grade steam entering the heat exchanger 25 from the third stage 56 of the multiple effect evaporator 35 is insufficient to accomplish the heating in order to boil or flash off the anti-solvent acetone. Similarly, a salt dryer 70, not illustrated in FIG. 2, is provided with a suitable heating coil 72 in order to dry the salt which is produced, as previously described via the exit lines 22 from the solvent/anti-solvent reactor 20, the exit line 45 from the stage one evaporator 36, the exit line 55 from the stage two evaporator 46 and the exit line 65 from the stage three evaporator line 56. All the salt from these various sources is combined and dried with the heating coil 72 in the dryer 70.

Accordingly, it is seen that a system and process has been provided for treating salt cake to recover salt in which at least about ¼ of the salt is treated in a substantially energy free method using a combined multiple effect evaporator and an anti-solvent.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A process for treating aluminum salt cake containing water soluble halide salts, comprising contacting the salt cake with water to dissolve water soluble halide salts forming a saturated brine solution, splitting the saturated brine solution, transporting a portion of the split saturated brine solution to a solvent reactor and introducing into the saturated bring solution a water-miscible low-boiling organic material in an amount sufficient to precipitate a portion of the dissolved halide salts forming at least a two-phase mixture of an aqueous-organic-salt solution phase and a precipitated salt phase, separating the precipitated salt phase from the aqueous-organic-salt solution phase, transporting another portion of the split saturated brine solution to an evaporator producing low grade steam waste product, and passing the aqueous-organic-salt solution phase in direct heat exchange relationship with the low grade steam to boil off the organic portion of the solution and recycling same to the reactor, wherein normally discarded low grade steam from an evaporator provides the required energy to treat a portion of the dissolved halide salts from the salt cake.

2. The process of claim 1, wherein the water soluble halide salts include alkali metal and alkaline earth metal chlorides.

3. The process of claim 1, wherein the portion of the saturated brine solution transported to the reactor does not exceed about 25% by weight of the saturated brine solution.

4. The process of claim 1, wherein the water-miscible low-boiling organic material is selected from the class consisting of acetone, isopropyl alcohol, dimethyl ether and mixtures thereof.

5. The process of claim 1, wherein the water-miscible low-boiling organic material is acetone, or isopropyl alcohol or mixtures thereof.

6. The process of claim 1, wherein the water-miscible low-boiling organic material is acetone.

7. The process of claim 1, wherein the evaporator is a multiple effect evaporator containing three stages.

8. The process of claim 1, wherein the low grade steam stream has a temperature of about 100° C. at about 1 atm.

9. The process of claim 1, wherein the evaporator is a multiple effect evaporator having three stages, each stage of which receives a portion of the split saturated brine and produces steam and a concentrated brine solution.

10. A process for treating aluminum salt cake containing water soluble halide salts, comprising contacting the salt cake with water to dissolve water soluble halide salts forming a saturated brine solution, transporting a portion of about 25% of the saturated brine solution to a solvent reactor and introducing into the saturated brine solution at least an equal volume of a water-miscible low-boiling organic material to precipitate a portion of the dissolved halide salts forming a three-phase mixture of an aqueous-organic-salt solution phase and a precipitated salt phase and an organic rich phase, separating the precipitated salt phase from the other phases and recycling the organic rich phase to the reactor, transporting a portion of about 75% of the saturated brine solution to a multiple effect evaporator having a plurality of stages with the last stage thereof producing low grade steam, and passing the aqueous-organic-salt solution in direct heat exchange relationship with the low grade steam to boil off the organic portion of the solution and recycling same to the reactor with the organic rich phase, whereby normally discarded low grade steam from a multiple effect evaporator provides the required energy to treat a portion of the dissolved halide salts from the salt cake.

11. The process of claim 10, and further comprising using a steam generator for supplying steam to the first stage of the multiple effect evaporator.

12. The process of claim 11, wherein the steam generator supplies saturated steam at about 130° C. at about 2.7 atm to the first stage of a three stage evaporator.

13. A process for treating aluminum salt cake containing water soluble halide salts, comprising contacting the salt cake with water to dissolve water soluble halide salts forming a saturated brine solution, transporting a portion of about 25% of the saturated brine solution to a reactor and introducing into the saturated brine solution at least an equal volume of a water-miscible low-boiling organic material to precipitate a portion of the dissolved halide salts forming a three-phase mixture of an aqueous-organic-salt solution phase and a precipitated salt phase and an organic rich phase, separating the precipitated salt phase from the other phases and recycling the organic rich phase to the reactor, transporting a portion of about 75% of the saturated brine solution to a multiple effect evaporator having three stages with the last stage thereof producing low grade steam, using a steam generator to supply steam at about 130° C. at about 2.7 atm to the first stage of the multiple effect evaporator, wherein the saturated brine solution transported to the first stage of the three stage evaporator is passed in heat exchange relationship with the steam from the steam generator producing saturated steam at a temperature of about 120° C. at a pressure of about 2 atm while salt precipitates into a concentrated brine solution at the bottom of the first stage and the steam at about 120° C. and about 2 atm is passed in heat exchange relationship in the second stage of the three stage evaporator with the saturated brine solution transported thereto producing saturated steam at a temperature of about 110° C. at a pressure of about 1.4 atm while salt precipitates into a concentrated brine solution at the bottom of the second stage and the steam at about 110° C. and about 1.4 atm is passed in heat exchange relationship in the third stage of the three stage evaporator with the saturated brine solution transported thereto producing steam at about 100° C. at a pressure of about 1 atm while salt precipitates into a concentrated brine solution at the bottom of the third stage, the steam produced in the third stage being low grade steam.

14. The process of claim 13, wherein the concentrated brine solutions from each stage of the multiple stage evaporator are combined with the precipitated salt phase from the reactor and the exhausted steam used to heat the aqueous saturated brine solutions in each stage of the multiple stage evaporator are combined and recycled to dissolve salts from the salt cake.

15. The process of claim 14, wherein the steam used to heat the first stage of the three stage evaporator is recycled to the steam generator and the steam used to heat the second and third stages of the three stage evaporator is recycled to the salt cake to dissolve same.

16. The process of claim 15, wherein the process is continuous.

17. A system for treating aluminum salt cake containing water soluble halide salts, comprising a salt extraction tank, means for transmitting the salt cake and water to said extraction tank and contacting same to form a saturated brine solution, a solvent reactor, a multiple effect evaporator connected to a source of steam, a splitter provided to split the saturated brine solution means for transporting a portion of the split saturated brine solution to said reactor, means for introducing into the saturated brine solution a water-miscible low-boiling organic material from a supply thereof in an amount sufficient to precipitate a portion of the dissolved halide salts forming at least a two-phase mixture of an aqueous-organic-salt solution phase and precipitated salt phase, means for separating the precipitated salt phase from the aqueous-organic-salt solution phase, means for transporting another portion of the split saturated brine solution to said multiple effect evaporator, the last stage thereof producing low grade steam, a direct contact heat exchanger, means for transporting the low grade steam to said heat exchanger and passing the aqueous-organic-salt solution in heat exchange relationship with the low grade steam to boil off the organic portion of the solution and means for recycling said organic portion to said reactor, whereby normally discarded low grade steam from a multiple effect evaporator provides the required energy to treat a portion of the dissolved halide salts from the salt cake.

18. The system of claim 17, wherein a splitter is provided to split the saturated brine from the extraction tank into two streams, the stream going to the reactor being about 25% of the saturated brine leaving the extractor and the stream going to the multiple effect evaporator being about 75% of the saturated brine leaving the extractor.

19. A system for treating aluminum salt cake containing water soluble halide salts, comprising a salt extraction tank, means for transmitting the salt cake and water to said extraction tank and contacting same to form a saturated brine solution, a solvent reactor and a three stage multieffect evaporator connected to a source of steam, means for transporting a portion of the saturated brine solution to said reactor means for introducing into the saturated brine solution a water-miscible low-boiling organic material from a supply thereof in an amount sufficient to precipitate a portion of the dissolved halide salts forming at least a two-phase mixture of an aqueous-organic-salt solution phase and precipitated salt phase, means for separating the precipitated salt phase from the aqueous-organic-salt solution phase, means for transporting a portion of the saturated brine solution to said three stage evaporator, the last stage thereof producing low grade steam, a direct contact heat exchanger, means transporting the low grade steam to said heat exchanger and for passing the aqueous-organic-salt solution in heat exchange relationship with the low grade steam to boil off the organic portion of the solution, means for recycling said organic portion to said reactor, a splitter and a source of steam wherein the first stage of said three stage evaporator receives steam from the source thereof and a portion of the saturated brine from the splitter, the steam from the source thereof heating the saturated brine boiling off product which is transmitted to the second stage as a heating medium and producing a concentrated brine solution removed as product with the steam from the source thereof being recycled, the product steam from the first stage heating saturates brine in the second stage producing product steam which is transmitted to the third stage as a heating medium and producing a concentrated brine solution removed as a product with the steam from the first stage being recycled, the product steam from the second stage heating saturated brine in the third stage producing low grade steam which is transmitted to said reactor as a heating medium for boiling off the organic material and producing a concentrated brine solution in the third stage removed as a product with the steam from the second stage being recycled.

20. The system of claim 19, wherein the low grade steam is at a temperature of about 100° C. and at a pressure of about 1 atm.

* * * * *